US008578016B2

(12) United States Patent
Childress et al.

(10) Patent No.: US 8,578,016 B2
(45) Date of Patent: Nov. 5, 2013

(54) NON-INVASIVE DISCOVERY OF RELATIONSHIPS BETWEEN NODES IN A NETWORK

(75) Inventors: Rhonda L. Childress, Austin, TX (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 2382 days.

(21) Appl. No.: 10/753,858

(22) Filed: Jan. 8, 2004

(65) Prior Publication Data
US 2005/0154776 A1 Jul. 14, 2005

(51) Int. Cl.
*G06F 15/16* (2006.01)

(52) U.S. Cl.
USPC ............................................. 709/224

(58) Field of Classification Search
USPC ............................................. 709/224
See application file for complete search history.

(56) References Cited

U.S. PATENT DOCUMENTS

| 5,455,952 A | 10/1995 | Gjovaag ..................... 395/700 |
| 5,596,703 A | 1/1997 | Eick et al. .................. 395/326 |
| 5,720,018 A | 2/1998 | Muller et al. ............... 395/133 |
| 5,835,720 A | 11/1998 | Nelson et al. |
| 5,894,479 A | 4/1999 | Mohammed |
| 6,182,136 B1 | 1/2001 | Ramanathan et al. ....... 709/224 |
| 6,295,276 B1 | 9/2001 | Datta et al. |
| 6,425,007 B1 * | 7/2002 | Messinger .................. 709/224 |
| 6,473,802 B2 | 10/2002 | Masters |
| 6,499,034 B1 | 12/2002 | Mackinlay ................... 707/102 |
| 7,150,015 B2 | 12/2006 | Pace et al. |
| 7,418,547 B2 | 8/2008 | Lam |
| 7,733,806 B2 | 6/2010 | Childress et al. |
| 2002/0040400 A1 | 4/2002 | Masters |
| 2002/0103631 A1 | 8/2002 | Feldmann et al. |
| 2002/0105911 A1 * | 8/2002 | Pruthi et al. ................. 370/241 |
| 2002/0194324 A1 | 12/2002 | Guha |
| 2003/0005092 A1 * | 1/2003 | Nelson et al. ................ 709/220 |
| 2003/0033402 A1 | 2/2003 | Battat et al. ................. 709/224 |
| 2003/0074473 A1 * | 4/2003 | Pham et al. .................. 709/246 |

(Continued)

FOREIGN PATENT DOCUMENTS

| EP | 0918412A2 A2 | 5/1999 |
| JP | 06062013 A | 3/1994 |

(Continued)

OTHER PUBLICATIONS

Plummer, "An Ethernet Address Resolution Protocol—or—Converting Network Protocol Addresses to 48.bit Ethernet Address for Transmission on Ethernet Hardware", Network Working Group, Nov. 1982, 10 pages.

(Continued)

*Primary Examiner* — Hussein Elchanti
*Assistant Examiner* — Maceeh Anwari
(74) *Attorney, Agent, or Firm* — Yee & Associates, P.C.; Jeffrey S. LaBaw

(57) ABSTRACT

A method, apparatus, and computer instructions for identifying nodes in a network data processing system. Cache data is received from a set of routers in the data processing system. The cache data includes an identification of the nodes sending data packets onto the network data processing system. The nodes on the network data processing system are identified using the cache data from the set of routers.

17 Claims, 3 Drawing Sheets

(56) References Cited

U.S. PATENT DOCUMENTS

2004/0221296 A1 11/2004 Ogielski et al.
2005/0154758 A1 7/2005 Childress et al.
2007/0113017 A1* 5/2007 Lam .............................. 711/135

FOREIGN PATENT DOCUMENTS

| JP | 10303961 A | 11/1998 |
| JP | 2001075687 A | 3/2001 |
| JP | 2002281059 A | 9/2002 |
| WO | WO0005594 A1 | 2/2000 |

OTHER PUBLICATIONS

Childress et al., Method and Apparatus For Supporting Transactions.

USPTO Notice of Allowance for U.S. Appl. No. 11/855,259 dated Dec. 14, 2009.

Non-final office action dated Jul. 10, 2009 regarding U.S. Appl. No. 11/855,259, 21 pages.

Notice of allowance dated May 5, 2010 regarding U.S. Appl. No. 11/855,259, 4 pages.

* cited by examiner

NON-INVASIVE DISCOVERY OF RELATIONSHIPS BETWEEN NODES IN A NETWORK

CROSS REFERENCE TO RELATED APPLICATION

The present invention is related to an application entitled Method and Apparatus for Supporting Transactions, Ser. No. 10/753,817, filed even date hereof, assigned to the same assignee, and incorporated herein by reference.

BACKGROUND OF THE INVENTION

1. Technical Field

The present invention relates generally to an improved data processing system and in particular to a method and apparatus for processing data in a network data processing system. Still more particularly, the present invention relates to a method, apparatus, and computer instructions for identifying nodes in a network data processing system.

2. Description of Related Art

A network data processing system is a system that transmits any combination of voice, video, and/or data between different clients. The network for this system includes a medium used to provide communications links between various devices and computers connected within the network data processing system. These devices include permanent connections, such as wire or fiber optic cables, or temporary connections, such as those made through telephone connections. Devices in addition to server and client machines include bridges, routers, and switches. Additionally, a network data processing system also may include wireless connections with supporting hardware, such as antennas and towers.

A number of different types of networks are present, such as a wide area network (WAN) and a local area network (LAN). A LAN is a communications network that serves users within some confined geographic area. Typically, a LAN uses clients and servers that have network-enabled operating systems. A WAN is a communications network covering a wide geographic area, such as a state or country. LANs are typically limited to a building or complex. Another example of a network is the Internet. The Internet, also referred to as an "internetwork", is a set of computer networks, possibly dissimilar, joined by means of gateways that handle data transfer and the conversion of messages from a protocol of the sending network to a protocol of the receiving network. When capitalized, the term "Internet" refers to the collection of networks and gateways that use the TCP/IP suite of protocols.

Businesses and other organizations employ network data processing systems to conduct business and other transactions. These networks may be as small as a single LAN or may encompass many networks, including the Internet.

Enterprise networking involves using a network infrastructure in a large enterprise or business organization with multiple computer systems and networks. These types of infrastructures are typically extraordinarily complex. An enormous amount of effort goes into planning and managing the integration of different disparate networks and systems. Also, planning for additional interfaces as needs and demands change also occurs. In managing these network data processing systems, it is important to identify nodes within the network data processing system to identify resources in the network data processing system. A node is a network junction or connection point. A terminal, computer, hub, and switch are considered nodes. Currently, nodes are identified by sending or "pinging" addresses on a network data processing system and waiting for a response from the device at the address.

Such a system of identifying nodes becomes increasingly difficult with the increasing use of personal firewalls by users. With these personal firewalls, a node may ignore pings or data sent to the node. In particular, these personal firewalls consume Internet Control Message Protocol (IMCP) packets, making this traditional means of node discovery useless. As a result, a network manager or administrator is unable to identify what nodes are actually present on a network data processing system.

Therefore, it would be advantageous to have an improved method, apparatus, and computer instructions for identifying nodes on a network data processing system.

SUMMARY OF THE INVENTION

The present invention provides a method, apparatus, and computer instructions for identifying nodes in a network data processing system. Cache data is received from a set of routers in the data processing system. The cache data includes an identification of the nodes sending data packets onto the network data processing system. The nodes on the network data processing system are identified using the cache data from the set of routers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
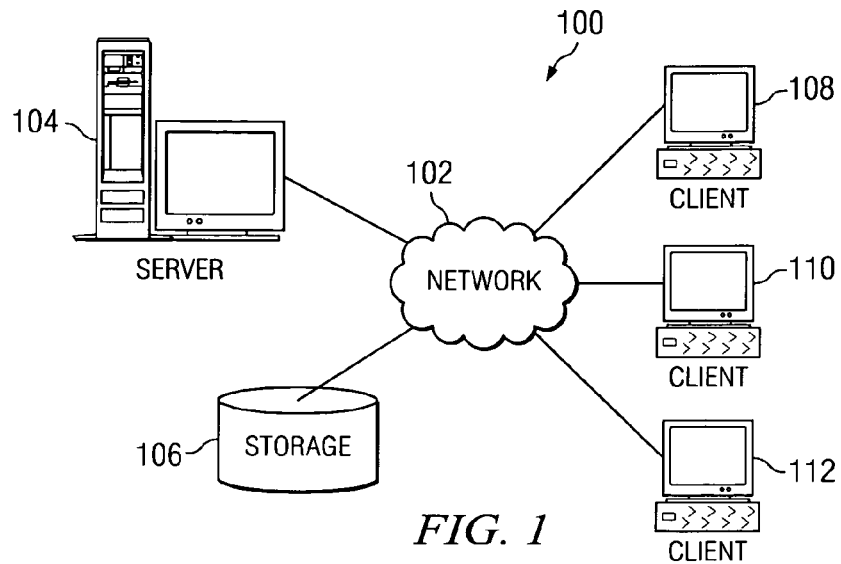
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
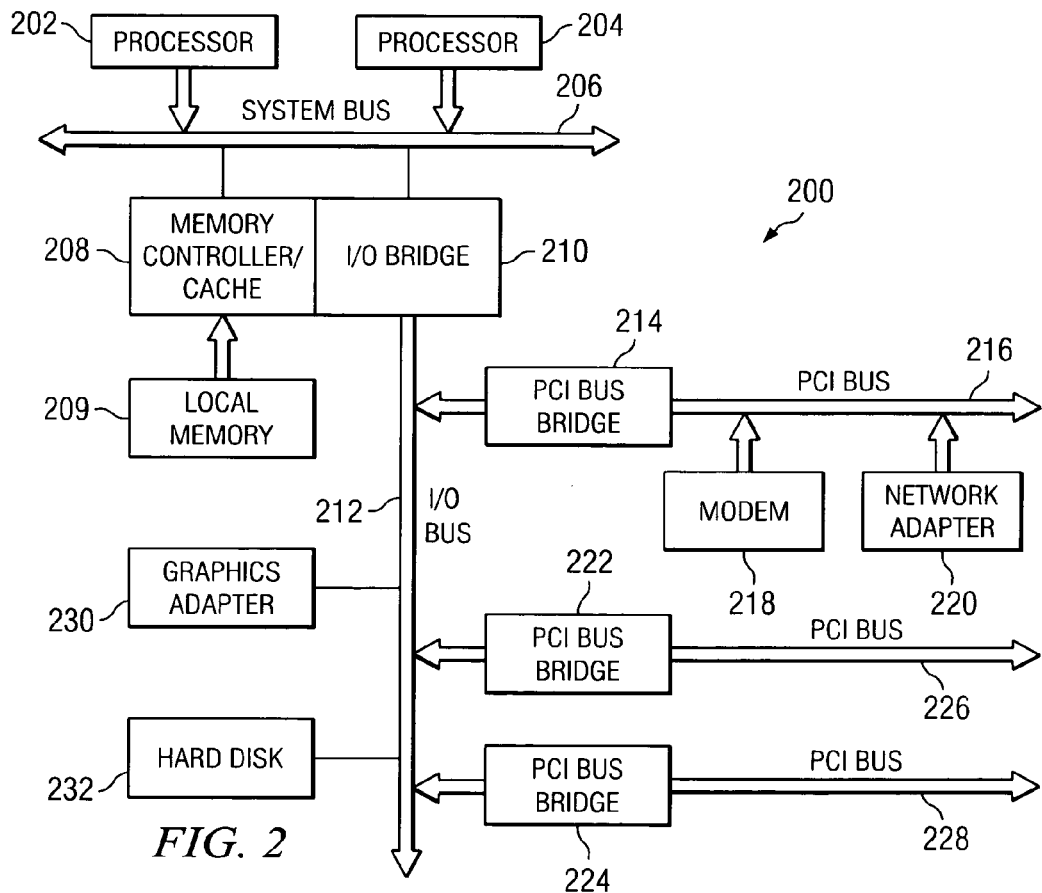
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
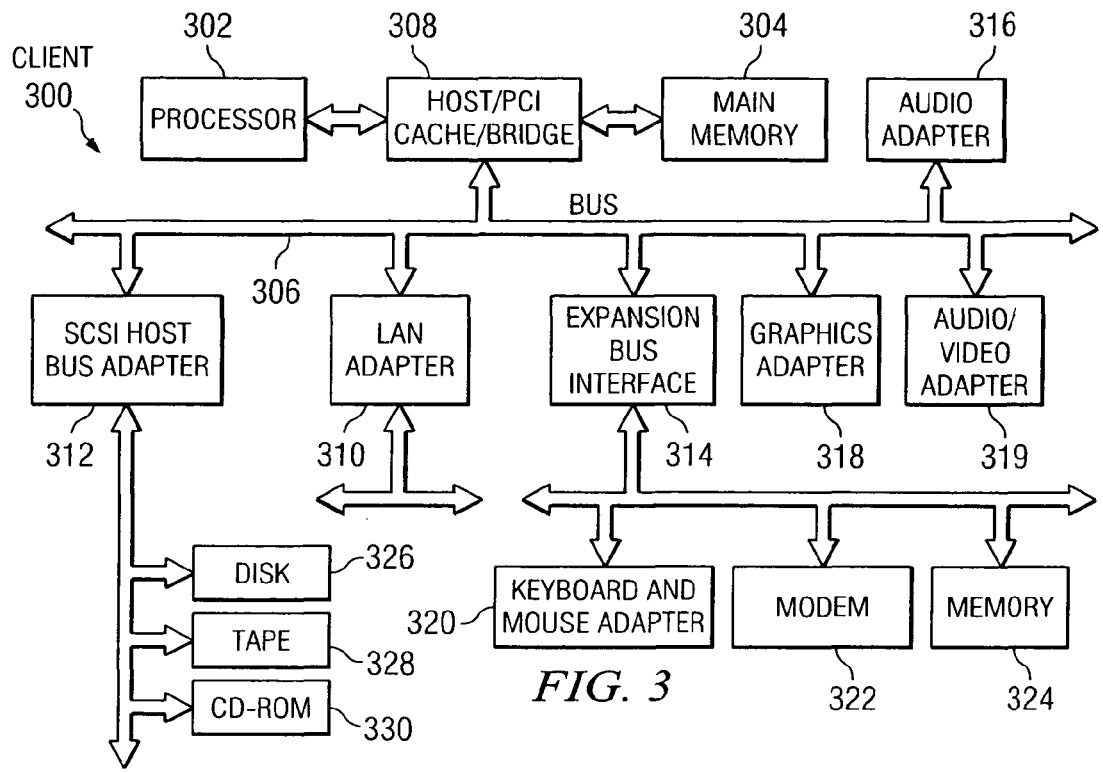
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 may be a personal digital assistant (PDA), notebook computer or hand held computer in addition to taking the form of a PDA. Data processing system 300 also may be a kiosk or a Web appliance.

The present invention provides a method, apparatus, and computer instructions for a non-invasive discovery of nodes on a network. In particular, the mechanism of the present invention may be implemented with transmission control protocol/Internet protocol (TCP/IP) networks. Further, the mechanism of the present invention utilizes cache data from routers or other devices in the network to identify nodes in a network as well as the communication paths between the nodes.

In particular, the data is obtained from an address resolution protocol (ARP) data cache located in a node, such as router. ARP is described in more detail in RFC 826 entitled "Ethernet Address Resolution Protocol: Converting Network Protocol Addresses to 48.Bit Ethernet Address for Transmission on Ethernet Hardware", which is incorporated herein by reference.

This data is used to generate a display of the nodes and the relationships between the nodes, as well as the amount of network traffic. The mechanism of the present invention employs an agent or daemon to generate a snapshot of ARP data and store that data in a store for analysis. Each time the data is obtained from the cache in the router, the data is cleared from the cache. In this manner, the different snapshots of the cache data may be used to present traffic volume and node relationships over time. This information from the snapshots may be used to map against network planning data for validation and for planning or to validate service level agreement compliances as well as meeting service level agreement criteria. Estimates of traffic and paths may be identified through clearing the ARP cache and seeing how quickly entries reappear in the cache.

Figure 4:
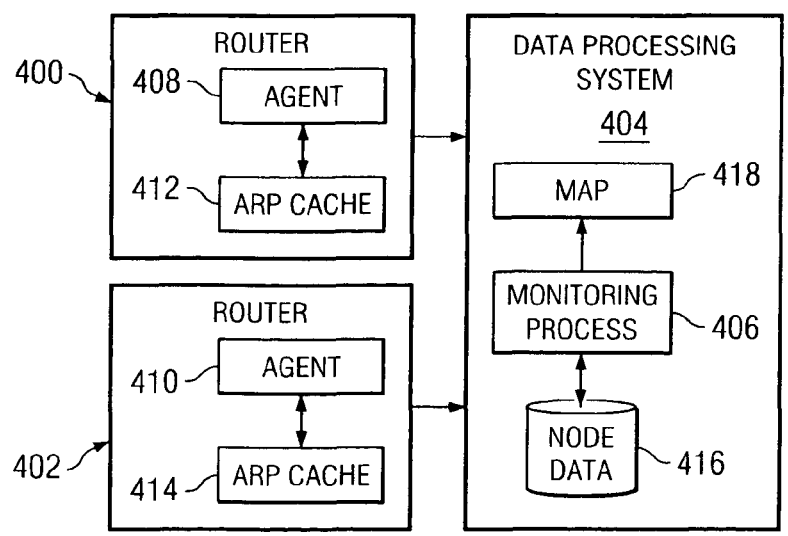
FIG. 4 is a diagram illustrating components used in discovering nodes in relationships between nodes on a network data processing system in accordance with a preferred embodiment of the present invention.

With reference now to FIG. 4, a diagram illustrating components used in discovering nodes and relationships between nodes in a network data processing system is depicted. In this illustrative example, router 400 and router 402 are present in a network data processing system, such as network data processing system 100 in FIG. 1. In particular, these devices may be located as part of network 102. Data processing system 400 is used to obtain data from data caches in router 400 and router 402 in these illustrative examples.

In particular, monitoring process 406 in data processing system 404 obtains data from agent 408 and agent 410, which are located in router 400 and router 402, respectively. These agents are processes or daemons that are used to obtain a snapshot of data in ARP cache 412 and ARP cache 414, respectively.

When agent 408 obtains data from ARP cache 412, the data is cleared from ARP cache 412. This data is sent to monitoring process 406, which stores the snapshot of ARP cache 412 in node data 416. Similarly, agent 410 obtains a snapshot of data in ARP cache 414 and sends that information to monitoring process 406 for storage in node data 416. Thereafter the data is cleared from ARP cache 414.

ARP cache 412 and ARP cache 414 contain data, identifying nodes that have sent packets that have been routed through router 400 or router 402. By obtaining this information from these data caches in router 400 and router 402, nodes that have transmitted packets may be identified, even though these nodes may not respond to direct requests for responses. In this manner, the identification of nodes on a network data processing system is made in a non-invasive manner.

Using node data 416, monitoring process 406 generates map 418. This map is used to present a graphical view of nodes in the network data processing system. Further, this map includes an identification of communication paths between the different nodes as well as an identification of network traffic.

Figure 5:
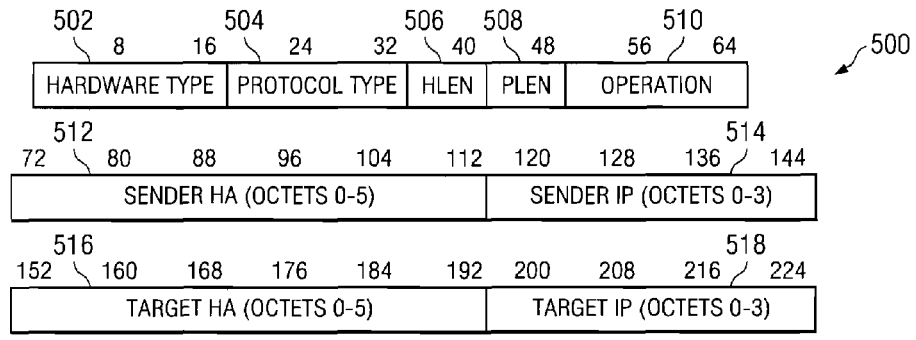
FIG. 5 is a diagram illustrating an entry in the data cache for a router in accordance with a preferred embodiment of the present invention.

Turning now to FIG. 5, a diagram illustrating information stored for entry in the data cache for a router is depicted in accordance with a preferred embodiment of the present invention. Entry 500 is an example of data that is stored in an ARP entry in these examples. Each of these entries is made in response to the routing of a packet through a router from a node.

Entry 500 includes hardware type 502, protocol type 504, HLEN 506, PLEN 508, operation 510, sender hardware address (HA) 512, sender IP 514, target hardware address (HA) 516, and target IP 518.

Hardware type 502 is the type of adapter, such as an Ethernet adapter, that is being used. Protocol type 504 is the type of protocol being used to transmit messages. In these examples, the protocol type is IP. HLEN 506 is the length in bytes of the hardware address, while PLEN 508 is the length in bytes of the protocol address. Operation 510 indicates the type of operation being performed, such as a request or a reply.

In these examples, sender hardware address 512 is a media access control (MAC) address, which is included in a packet from a node transmitting the packet. A MAC address is a unique serial number that is associated with an adapter to identify that adapter from all others on a network. Sender IP 514 is the IP address of the node, which is also referred to as the source address. The target hardware address is the MAC address for an adapter in the target node. The target IP is the IP address of the destination node, which is also referred to as the destination address for the packet.

Figure 6:
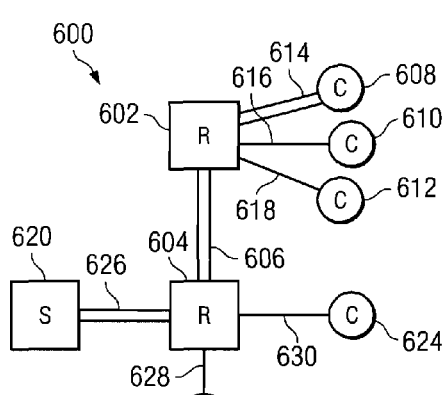
FIG. 6 is a diagram illustrating a graphical view of nodes in a network data processing system in accordance with a preferred embodiment of the present invention.

Turning now to FIG. 6, a diagram illustrating a graphical view of nodes in a network data processing system is depicted in accordance with a preferred embodiment of the present invention. Display 600 is an example of a display that may be generated from using information gathered from data caches of different routers.

In particular, display 600 is an example of a graphical view of a map, such as map 418 in FIG. 4. As can be seen, two of the nodes present in display 600 are router 602 and router 604 with a connection 606 between these two nodes. Clients 608, 610, and 612 are connected to router 602 through connections 614, 616, and 618. Further, router 604 includes server 620, client 622, and client 624 connected to router 604 through connections 626, 628, and 630. These connections indicate communication paths between different nodes in the network data processing system.

Further, the traffic between these different communication paths is indicated graphically through segments having different thicknesses. As can be seen, connection 626 and connection 606 have a heavier amount of traffic than the other illustrated connections. Connection 614 has less traffic when compared to connections 606 and 626, but has more traffic when compared to the other illustrated connections.

The manner in which the different nodes are depicted in diagram 600 is presented for purposes of illustration only. This illustration is not meant to limit the manner in which data may be presented in a graphical fashion. For example, colors or animations may be used to indicate the amount of traffic on a communication path in addition to or in place of the thickness of the segment representing the connection for the communication path.

Figure 7:
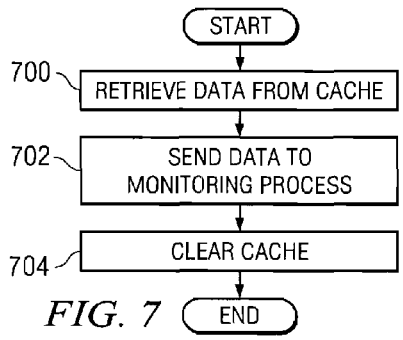
FIG. 7 is a flowchart for a process for obtaining a snapshot of data from a cache in accordance with a preferred embodiment of the present invention.

Turning now to FIG. 7, a flowchart for a process for obtaining a snapshot of data from a cache is depicted in accordance with a preferred embodiment of the present invention. The process illustrated in FIG. 7 may be implemented in an agent, such as agent 408 in FIG. 4 to obtain data from a data cache, such as ARP cache 412 in FIG. 4.

The process begins by retrieving data from the cache (step 700). Thereafter, the data is sent to a monitoring process (step 702). In the illustrative examples, the monitoring process is one such as monitoring process 406 in FIG. 4. Thereafter, the data cache is cleared (step 704) with the process terminating thereafter.

This process may be initiated on some periodic basis based on a timer executed by an agent process. Further, this process may be initiated through a request generated by the monitoring process in response to an event. This event may be periodic or non-periodic depending on the particular implementation. The event may be based on the expiration of the timer or based on some request generated by a network administrator in the illustrative examples.

Figure 8:
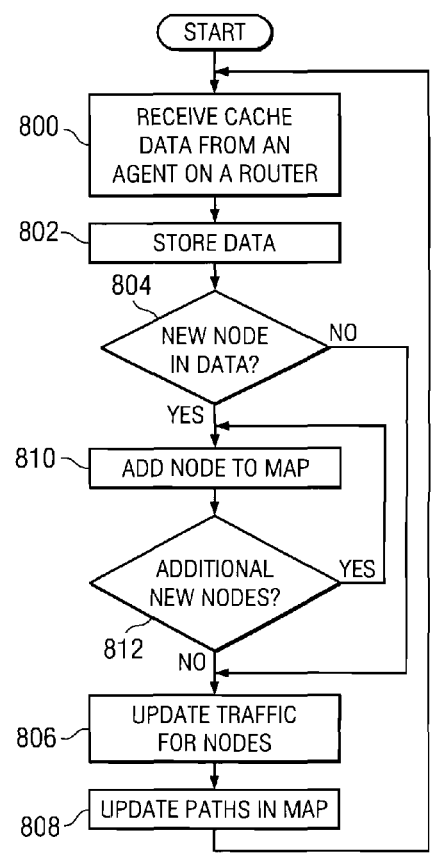
FIG. 8 is a flowchart of a process for identifying nodes using cache data from a router in accordance with a preferred embodiment of the present invention.

With reference now to FIG. 8, a flowchart of a process for identifying nodes using cache data from a router is depicted in accordance with a preferred embodiment of the present invention. The process illustrated in FIG. 8 may be implemented in a monitoring process, such as monitoring process 406 in FIG. 4.

The process begins by receiving cache data from an agent on a router (step 800). Thereafter, the data is stored (step 802). In these examples, the data is stored in a persistent store or storage device, such as node data 416 in FIG. 4. Thereafter, a determination is made as to whether a new node is identified in the data received from the router (step 804). This determination may be made by comparing the data received from the agent to the already stored data.

If a new node is not identified in the data, then traffic is updated for the node (step 806). This traffic may be used to present different graphical views of connections to indicate levels of traffic for different connections. Thereafter, the paths are updated in the map (step 808) with the process then returning to step 800.

With reference again to step 804, if a new node is present in the data, then that node is added to the map (step 810). A determination is made as to whether additional new nodes are present in the data received from the agent (step 812). If additional new nodes are present, the process returns to step 810. Otherwise, the process proceeds to step 806 as described above.

Thus, the present invention provides an improved method, apparatus, and computer instructions for discovering nodes in a network data processing system. Further, this mechanism is non-invasive because it does not require a response from any of the nodes that are identified. Identification of nodes in the network data processing system is made through the use of cache data from routers in the network data processing system. As different nodes transmit packets onto the network data processing system, information regarding these transmissions is stored in the cache data for the router. This information is obtained from different routers in the network data processing system to identify nodes.

Further, through tracking the identification of packets for nodes through different routers and paths and the traffic among paths may be identified. In this manner, the mapping of patterns of traffic as well as the identification of nodes and their interconnections may be used by network administrators and other planners to manage a network data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for identifying nodes in a network data processing system, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to receive cache data from a set of routers in the data processing system on a periodic basis, wherein the cache data includes an identification of the nodes sending data packets onto the network data processing system; identify the nodes on the network data processing system using the cache data from the set of routers; identify communication paths between end nodes using the cache data from the set of routers; and generate a display of the nodes in a graphical view comprising the communications paths between the nodes with a graphical indication of network traffic volume using the cache data received on a periodic basis, wherein the graphical view includes network traffic volume and node relationships over time.

2. A data processing system for identifying nodes in a network data processing system, the data processing system comprising a data processor and a memory coupled to the data processor, wherein the memory comprises instructions to cause the data processing system to perform, when executed by the data processor, steps of:
    receiving cache data from a set of routers in the data processing system on a periodic basis, wherein the cache data includes an identification of the nodes sending data packets onto the network data processing system;
    identifying the nodes on the network data processing system using the cache data from the set of routers;
    identify communications paths between end nodes using the cache data from the set of routers, and
    generating a display of the nodes in a graphical view comprising the communications paths between the nodes with a graphical indication of network traffic volume using the cache data received on a periodic basis, wherein the graphical view includes network traffic volume and node relationships over time.

3. The data processing system of claim 2, wherein the cache data is from a set of address resolution protocol caches located on the set of routers.

4. The data processing system of claim 3, wherein the cache data is received through agents located on the set of routers.

5. The data processing system of claim 4, where the agents clear the set of address resolution protocol caches each time data is sent to the data processing system.

6. The data processing system of claim 3, wherein the cache data contains entries for the nodes sending data packets onto the network data processing system and wherein each entry includes at least one of a media access control address, a source Internet Protocol address, and a destination Internet Protocol address.

7. The data processing system of claim 3, further comprising:
identifying network traffic on the communication paths using the cache data received on a periodic basis from the set of routers.

8. The data processing system of claim 7, wherein the cache data received on a periodic basis is used to validate service level agreement compliance.

9. The data processing system of claim 2, wherein the graphical indication comprises network connections of different thicknesses to indicate network traffic volume.

10. A computer program product in a non-transitory computer readable medium for identifying nodes in a network data processing system, the computer program product comprising:
first instructions for receiving cache data from a set of routers in the data processing system on a periodic basis, wherein the cache data includes an identification of the nodes sending data packets onto the network data processing system;
second instructions for identifying the nodes on the network data processing system using the cache data from the set of routers;
third instructions for identifying communications paths between end nodes using the cache data from the set of routers; and
fourth instructions for generating a display of the nodes in a graphical view comprising the communications paths between the nodes with a graphical indication of network traffic volume using the cache data received on a periodic basis, wherein the graphical view includes network traffic volume and node relationships over time.

11. The computer program product of claim 10, wherein the cache data is from a set of address resolution protocol caches located on the set of routers.

12. The computer program product of claim 11 further comprising:
fifth instructions for identifying the network traffic on the communication paths using the cache data received on a periodic basis from the set of routers.

13. The computer program product of claim 12, wherein the cache data received on a periodic basis is used to validate service level agreement compliance.

14. The computer program product of claim 11, wherein the cache data is received through agents located on the set of routers.

15. The computer program product of claim 14, wherein the agents clear the sets of address resolution protocol caches each time data is sent to the data processing system.

16. The computer program product of claim 11, wherein the cache data contains entries for the nodes sending data packets onto the network data processing system and wherein each entry includes at least one of a media access control address, a source Internet Protocol address, and a destination Internet Protocol address.

17. The computer program product of claim 10, wherein the graphical indication comprises network connections of different thicknesses to indicate network traffic volume.

* * * * *